(12) United States Patent
Calvet et al.

(10) Patent No.: US 6,661,962 B1
(45) Date of Patent: Dec. 9, 2003

(54) OPTICAL ELEMENT SUPPORT STRUCTURE AND METHODS OF USING AND MAKING THE SAME

(75) Inventors: Robert John Calvet, Pasadena, CA (US); Roman Carlos Gutierrez, La Crescenta, CA (US)

(73) Assignee: Siwave, Inc., Arcadia, CA (US)

( * ) Notice: Subject to any disclaimer, the term of this patent is extended or adjusted under 35 U.S.C. 154(b) by 74 days.

(21) Appl. No.: 10/001,092

(22) Filed: Nov. 15, 2001

(51) Int. Cl.[7] .................................................. G02B 6/00
(52) U.S. Cl. ...................... 385/137; 385/134; 385/135; 385/136
(58) Field of Search ............................... 385/137, 134, 385/135, 136; 248/60

(56) References Cited

U.S. PATENT DOCUMENTS

| | | | | |
|---|---|---|---|---|
| 5,214,735 A | * | 5/1993 | Henneberger et al. ...... 385/136 |
| 5,677,975 A | * | 10/1997 | Burek et al. ................. 385/136 |
| 5,835,652 A | * | 11/1998 | Yagi et al. ..................... 385/87 |
| 6,085,014 A | * | 7/2000 | Kajiwara ..................... 385/137 |
| 6,249,636 B1 | * | 6/2001 | Daoud ......................... 385/137 |
| 6,374,022 B1 | * | 4/2002 | Parmigiani et al. ......... 385/100 |
| 6,539,161 B2 | * | 3/2003 | Holman et al. ............. 385/136 |

* cited by examiner

Primary Examiner—Brian Healy
Assistant Examiner—David Petkovsek
(74) Attorney, Agent, or Firm—Fish & Richardson P.C.

(57) ABSTRACT

Optical element support structures and methods of using and making the same. One support structure is configured to restrain an optical element in at least two degrees of freedom. The structure comprises a first jaw, a first flexure, a second jaw and a second flexure. The first jaw has a first jaw face configured to contact the optical element. The first flexure is attached to the first jaw. The second jaw has a second jaw face configured to contact the optical element. The second flexure is attached to the second jaw. The first jaw face and the second jaw face are configured to restrain the optical element in at least two degrees of freedom.

58 Claims, 11 Drawing Sheets

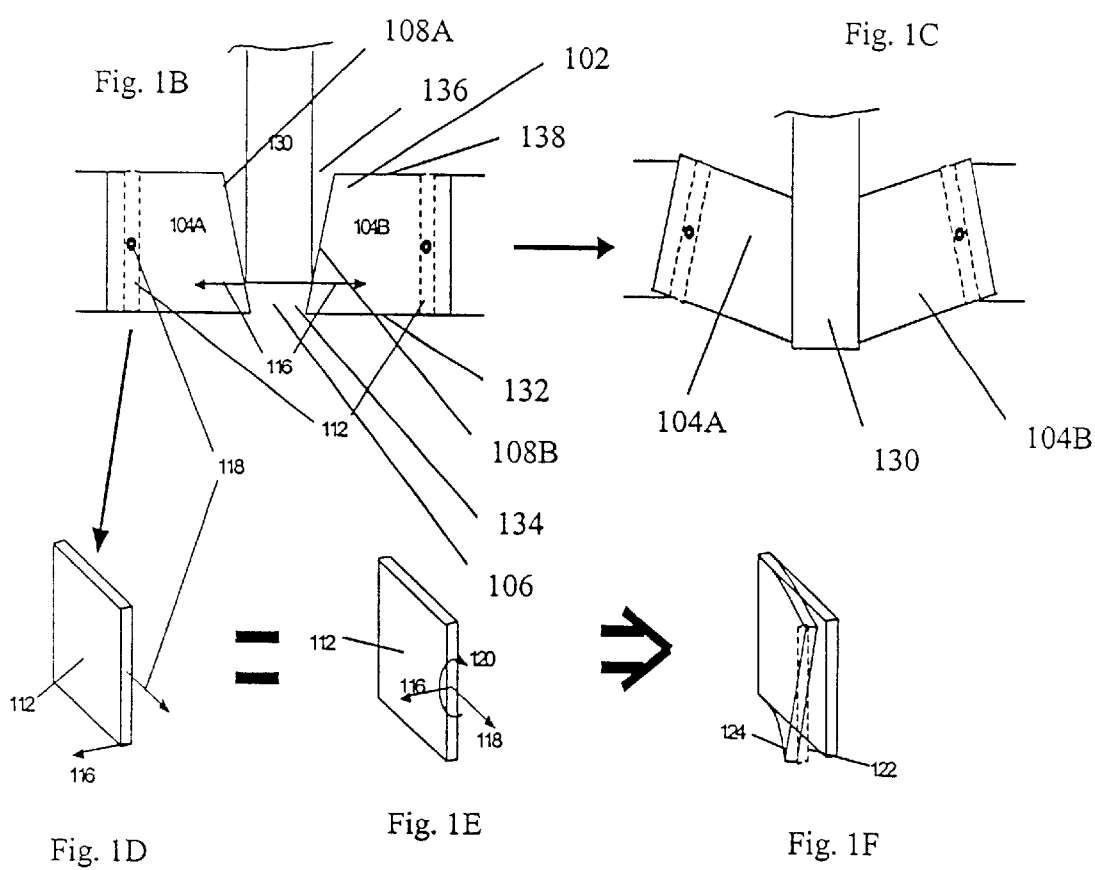

Figure 1G
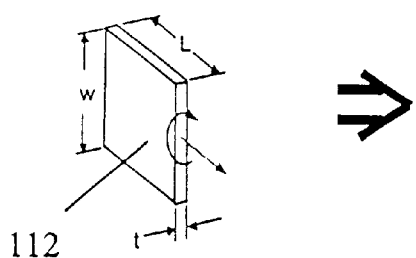
112
Figure 1H
Twist Stiffness = JG/L
where J = .333t^3 w and
G = Shear Modulus
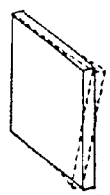
150B
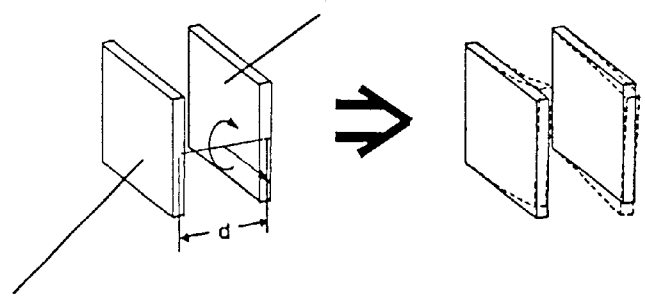
150A    Figure 1I
Twist Stiffness = 2GA/L*(d/2)^2 + 2JG/L
where A = t*w
Figure 1J

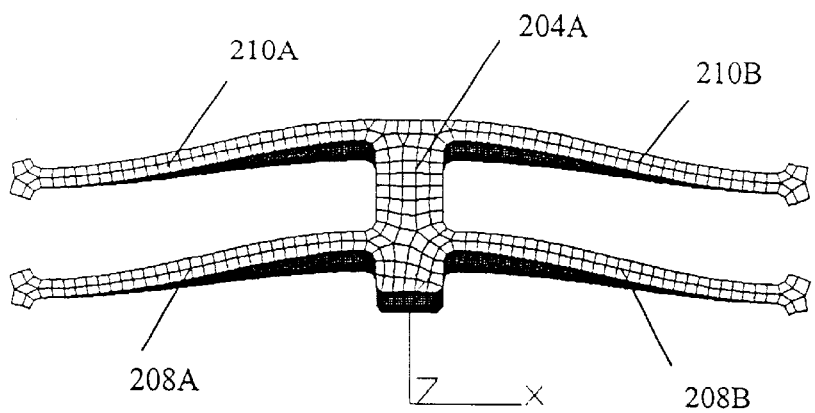
Figure 6
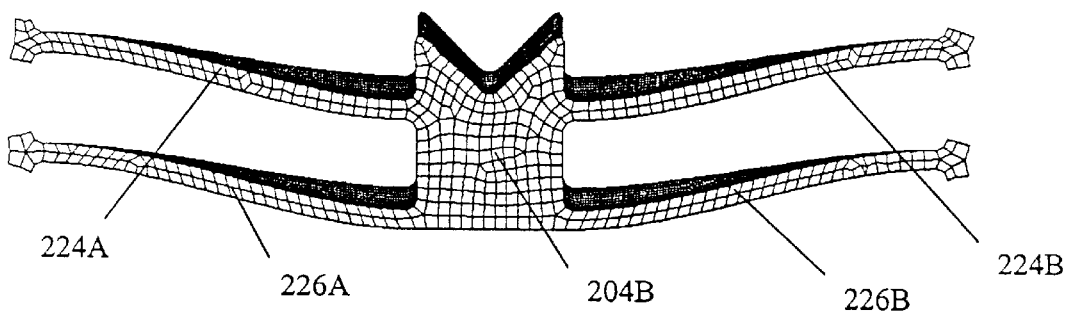
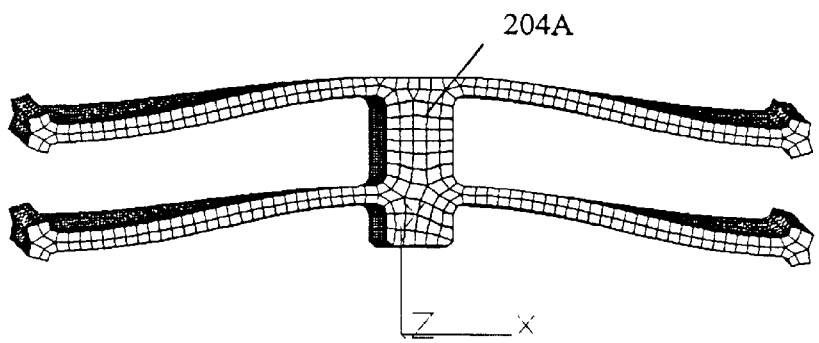
Figure 7
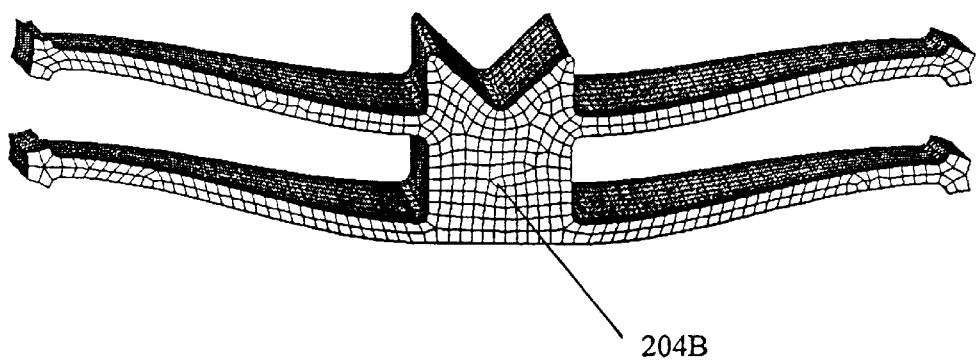

FIGURE 9    Physical Degrees of Freedom

Fiber Core Position Error in Standard V-groove

OPTICAL ELEMENT SUPPORT STRUCTURE AND METHODS OF USING AND MAKING THE SAME

BACKGROUND OF THE INVENTION

1. Field of the Invention

The present invention relates to optical element support structures and methods of making the same.

2. Description of the Related Art

A physical object, such as an optical fiber 900 in FIG. 9, possesses at least six positional degrees of freedom (DOFs), e.g., in Cartesian space, the six DOFs are X, Y, Z, θX, θY, θZ. The problem in any optical device is the constraint/specification of optically critical DOFs of various optical elements such that the elements are in alignment, thereby allowing the transmittance of light in an acceptable manner.

Typical optical elements such as rod lenses and fiber tips are usually circularly symmetric (shown about the Z axis in FIG. 9) and therefore require only five constrained DOFs to completely specify their positions (θZ is the unnecessary DOF).

Conventional fiber support structures often fail to accurately align fibers to desired positions, particularly where fibers vary in diameter due to manufacturing tolerances. Conventional fiber support structures also allow fibers to move undesirably prior to bonding.

In the milieu of small electro-optical and optomechanical devices, such as MicroElectroMechanical System (MEMs) optical devices, modulated laser transmitters and photodiode receivers for the telecommunications industry, fibers have been positioned for years using V-grooves in a silicon structure, or some variant thereof. FIG. 10 illustrates four DOFs of a fiber 900 controlled by a V-groove 1002 in a silicon structure 1000. The Z position is usually defined/controlled by either butting the end of the fiber 900 against another component or a micromachined stop, or by polishing one end 902 of the fiber 900 to some known reference position.

One drawback to the structure 1000 in FIG. 10 is the necessity of some external mechanical implement to hold the fiber 900 in the V-groove 1002 prior to bonding or soldering.

Another drawback is the lack of position compensation for changes in the diameter of a fiber 900, as shown in FIG. 11. FIG. 11 illustrates a maximum fiber diameter 1100 and a nominal fiber diameter 1102. An increase in diameter of 2 microns (typical range of manufacturing tolerance) would translate the core 1104 of the fiber 900 (the critical optical portion) in the Y direction by 1.73 microns (1 micron on the radius times 1/COS(54.74 degrees)). This variance may be unacceptable in some applications.

For lenses, the manufacturing tolerance range is much larger, e.g., on the order of 15 microns. Fortunately, positioning accuracy requirements may be somewhat less stringent for lenses.

SUMMARY OF THE INVENTION

Optical element support structures and methods of using and making the same are provided in accordance with the present invention. The optical element may be a lens, a rod lens, a fiber, a fiber end, a mirror or some other object, e.g., a holder for an optical component. The lens and fiber support structures may also be referred to herein as fiber or lens 'chucks.'

The support structures according to the invention may provide a number of advantages. For example, a support structure may temporarily restrain and align an optical element in a mounting wafer/substrate with a high degree of lateral centration. The optical element may or may not be glued to the support structure, depending on the desired level of constraint for an application. Lateral centration is measured by how close a center axis of an optical element, where it crosses an upper surface of the wafer, comes to a pre-determined point, e.g., the center of a hole, on that surface.

As another example, a support structure may also temporarily restrain and align an optical element in a mounting wafer such that the axis of the optical element is extremely close to a normal vector of the wafer surface. In some applications, it is desirable to have lateral centration within one micron, and alignment to the surface normal within 5 arcminutes. After the structure restrains the optical element, the element may be glued or bonded in place.

As another example, a support structure may also accommodate (or compensate for) variations or imperfections in the diameter of a fiber or lens, e.g., up to a couple microns for optical fibers or up to tens of microns for rod lenses. This characteristic may be called 'tolerance' for diameter imperfections. The support structures may also accurately restrain and align fiber ends and rod lenses after static deformation due to heat.

One aspect of the invention relates to a support structure configured to restrain an optical element in at least two degrees of freedom. The structure comprises a first jaw, a first flexure, a second jaw and a second flexure. The first jaw has a first jaw face configured to contact the optical element. The first flexure is attached to the first jaw. The second jaw has a second jaw face configured to contact the optical element. The second flexure is attached to the second jaw. The first jaw face and the second jaw face are configured to restrain the optical element in at least two degrees of freedom.

Another aspect of the invention relates to a method of forming an optical element support structure. The method comprises using radiation and a patterned mask to affect pre-determined areas of a photo-sensitive film on a substrate. The mask outlines a first jaw with a first jaw face configured to contact the optical element, a first flexure attached to the first jaw, a second jaw with a second jaw face configured to contact the optical element, and a second flexure attached to the second jaw. The first jaw face and the second jaw face are configured to restrain the optical element in at least two degrees of freedom. The method further comprises using a micromachining process to form the first jaw, first flexure, second jaw and second flexure in the substrate based on the mask outline.

BRIEF DESCRIPTION OF THE DRAWINGS

FIGS. 1B–1C illustrate a side view of a part of the structure in FIG. 1A with twist flexibility and radial flexibility.

FIGS. 1D–1F are isometric pictures of one flexure in FIG. 1A.

FIGS. 1G–1H illustrate an example of twist stiffness for a flexure in FIG. 1A.

FIGS. 1I–1J illustrate an example of twist stiffness for a flexure pair in FIG. 2 or FIG. 3.

FIGS. 6 and 7 illustrate three-dimensional views of active parts of the structure in FIG. 2.

DETAILED DESCRIPTION

Figure 1A:
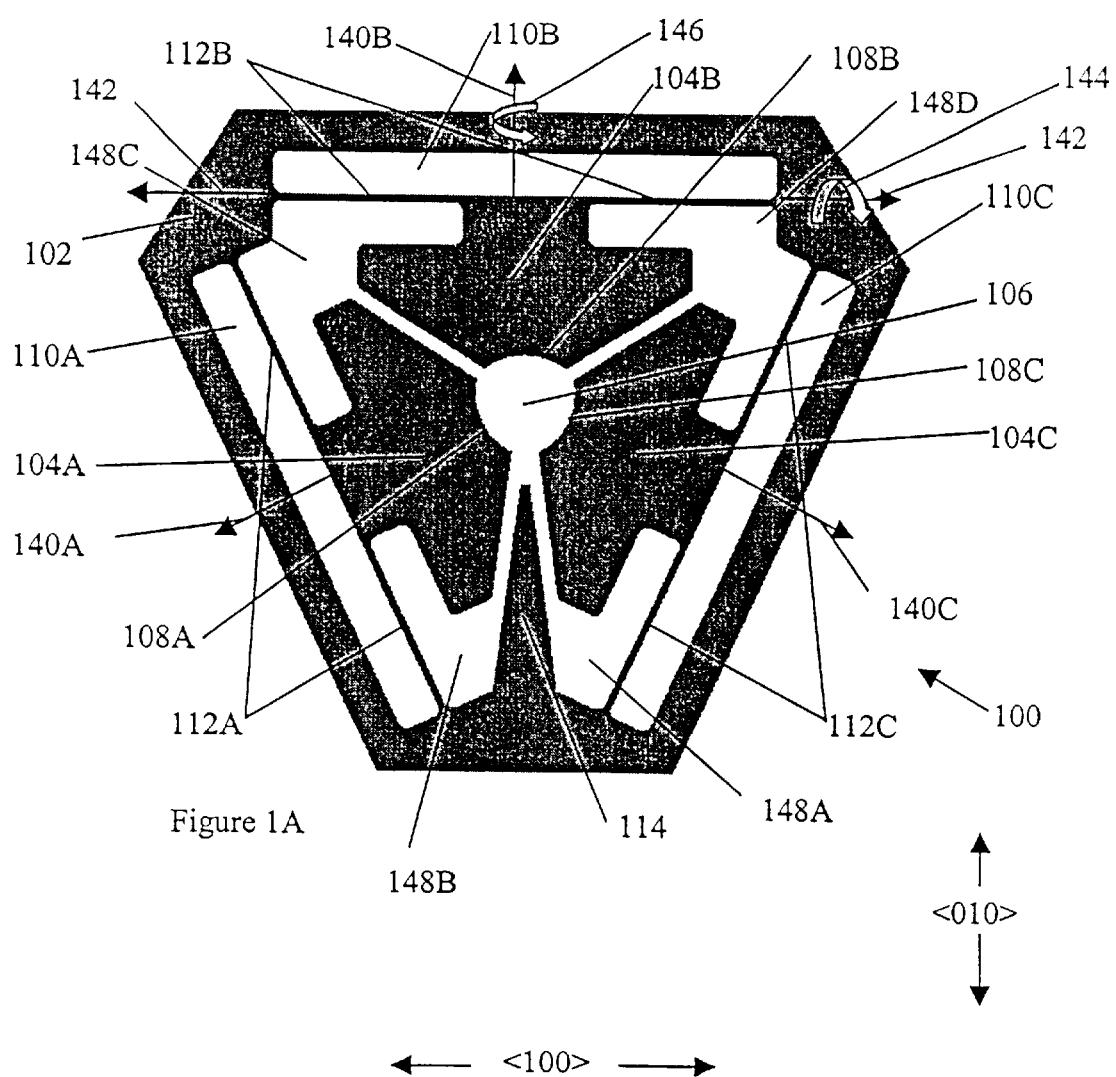
FIG. 1A illustrates a top view of one embodiment of a support structure.

FIG. 1A illustrates a top view of one embodiment of a support structure 100, which is configured to support an optical element, such as a lens or fiber. Although lenses and fibers are mentioned herein, the support structures may be used to support any optical element, such as a lens, a rod lens, a fiber, a fiber end or a mirror, or a variety of non-optical elements as well. The structure 100 comprises a substrate (or wafer) 102 of silicon or other suitable material, such as germanium, gallium arsenide, silicon carbide or any metal. In one configuration, the structure 100 is between about 400 and about 600 microns thick (thickness of the structure 100 is into the page of FIG. 1A). FIGS. 1B, 1C, 4, 5 and 8 illustrate the thickness or depth of four support structures 100, 200, 300, 800 in accordance with the present invention.

In FIG. 1A, the spaces 106, 110A–110C, 148A–148D may be formed by lithography and etching processes. Specifically, a photo-sensitive layer or film (called a photoresist) is formed on a substrate, and a mask is formed with a desired pattern, such as the pattern in FIG. 1A. The mask and specific areas of the photo-resist are exposed to radiation. A mask and exposed areas of photo-resist may have a very high level of accuracy, such as 1/10 of a micron.

Next, one or more micro-machining fabrication methods, such as Deep Reactive Ion Etching (DRIE), are used to remove material from the substrate 102 according to the masked pattern. The top surface of the substrate 102 where lithography and one or more micro-machining fabrication methods begin may be referred to as the 'mask' surface.

Other micro-machining methods such as sacrificial molding, LIGA (X-Ray Lithography, Galvanoformung, und Abformtechnik (X-Ray Lithography, Electrodeposition, and molding)), laser etching and FIB (Focused Ion Beam etching) may be used to form the structures described herein. Near-micro-machining methods such as Plunge EDM (Electrical Discharge Machining), Wire EDM, laser cutting, and even standard precision machining may also be used. In the description below, a DRIE type process is assumed to form the described structures.

After material is removed from the spaces 106, 110A–110C, 148A–148D of the substrate 102, the structure 100 comprises flexured jaws 104A–104C formed in the substrate 102. The flexured jaws 104A–104C have jaw faces 108A–108C that may be tangent to an optical element (e.g., fiber or lens) inserted in the hole 106. The jaw faces 108A–108C receive and grip an inserted element.

The structure 100 also comprises flexures 112A–112C. Each flexure 112 comprises a pair of collinear plates. As used herein, the term 'flexure' may refer to both plates, e.g., 112B, or one of the plates, e.g., one half of 112B. In one embodiment, the minimum thickness of a flexure 112 is about 1/30th of the substrate thickness. The 1/30th is an acceptable ratio for the structure 100 (and structures 200, 300 in FIGS. 2 and 3) to be formed by Deep Reactive Ion Etch (DRIE) processes. The other fabrication processes mentioned previously, e.g. LIGA, FIB, Plunge EDM, Wire EDM, etc., may also be used to form these types of support structures in FIGS. 1A, 2 and 3, albeit possibly with different ratio and absolute size limitations.

Figure 11:
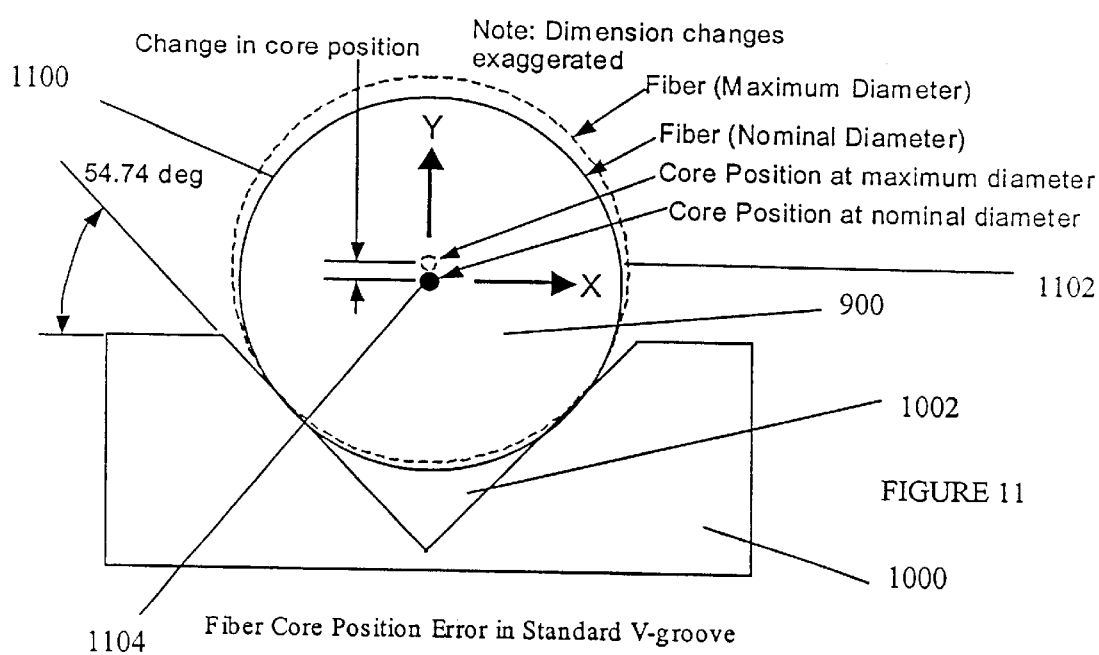
FIG. 11 illustrates a maximum fiber diameter 1100 and a nominal fiber diameter of a fiber in a v-groove of FIG. 10.

Lithographic fabrication methods may create flexures 112A–112C that are well-matched in thickness, and thus well-matched in stiffness. Any errors introduced by the above-mentioned fabrication methods are most likely common mode errors that affect all flexures 112A–112C equally. Thus, the structure 100 can accurately centrate an optical element (e.g., lens or fiber) inserted in the hole 106 even with gross deformation due to static errors/imperfections in the diameter of an optical element (see FIG. 11) or due to a condition such as temperature change or local heating.

The arrangement of each flexure 112 constrains each jaw 104 and allows no significant motion (i.e., applies stiffness) of the jaw 104 in (1) the plane of the flexure 112, e.g., out of the plane of FIG. 1A toward an observer and along the flexure 112 in the plane of FIG. 1A, and (2) in rotation about the normal to the plane of the flexure 112. These three restrained directions may be called 'stiff' degrees of freedom (DOFs). For example, the plane of the top flexure 112B in FIG. 1A is defined by the left and right horizontal arrows 142 and extends into and out of the page of FIG. 1A. The flexure 112B allows no significant motion for the jaw 104B in the horizontal plane of the flexure 112B, no significant motion vertically out of the plane of FIG. 1A, and no significant motion in rotation (denoted by arrow 146) about the normal (denoted by arrow 140B) of the flexure plane. The flexures 112A and 112C provide similar restraints with respect to their planes and normals 140A, 140C.

The restraint of three DOFs leaves three flexible DOFs on each jaw 104: (1) radial flexibility, e.g., along the normals 140A–140C to the flexure planes; (2) twist flexibility, e.g., direction 144 shown for flexure 112B and jaw 104B, and similar directions for the other two jaws 104A, 104C; and (3) rotational flexibility of each jaw 104 about an axis out of the plane of FIG. 1A. Of these DOFs, the rotation about an axis out of the plane of FIG. 1A does not affect positioning accuracy to a first order, and twist flexibility is described below.

Figure 12:
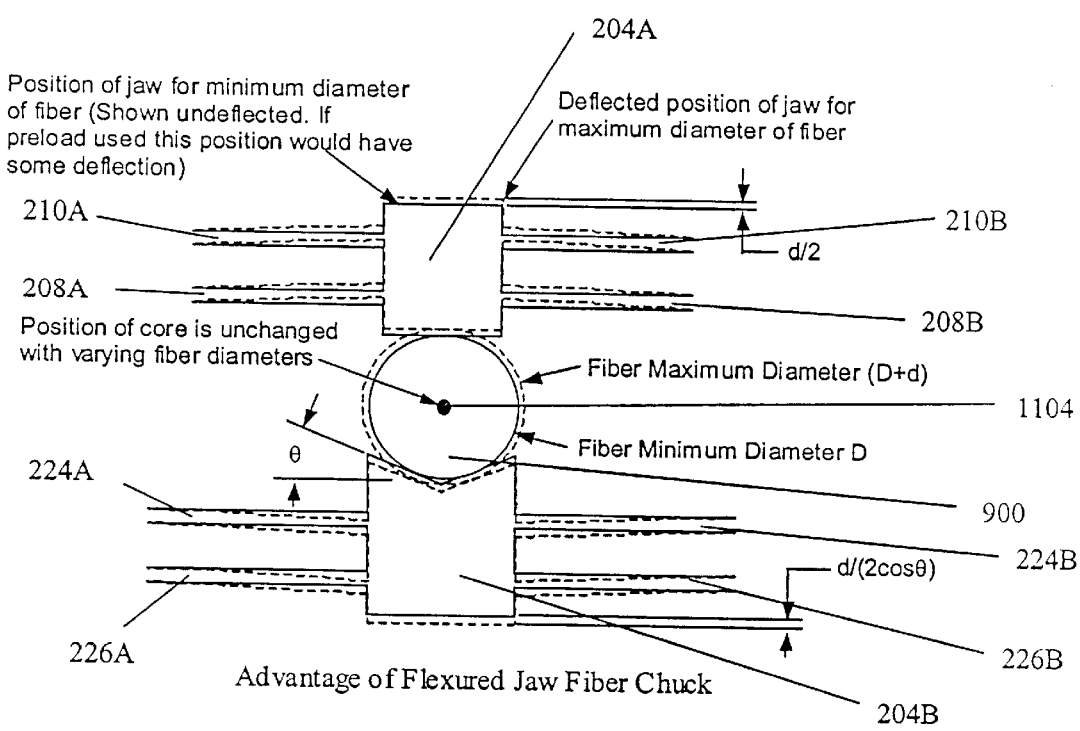
FIG. 12 illustrates an example of how flexures provide radial flexibility to two jaws in FIG. 2.

The radial flexibility of each jaw 104 is the key to accurate centration and temporary restraint of an inserted object. The well-matched stiffness of the flexures 112A–112C means any difference in diameter of an inserted cylindrical object, e.g., a fiber or a lens, is compensated by substantially equal radial motions of the jaws 104A–104C. The result is that the position of the center axis of the inserted cylindrical object is substantially the same for a range of object diameters. FIG. 12 illustrates an example of how flexures 208A, 208B, 210A, 210B, 224A, 224B provide radial flexibility to two jaws 204A, 204B in FIG. 2 (described below), which provide accurate centration and temporary restraint of an inserted object 900 with a varying diameter. In contrast to the fiber core position error in FIG. 11, there is no substantial position error of the fiber core 1104 in FIG. 12 because of the radial flexibility of the jaws 204A, 204B.

Figure 2:
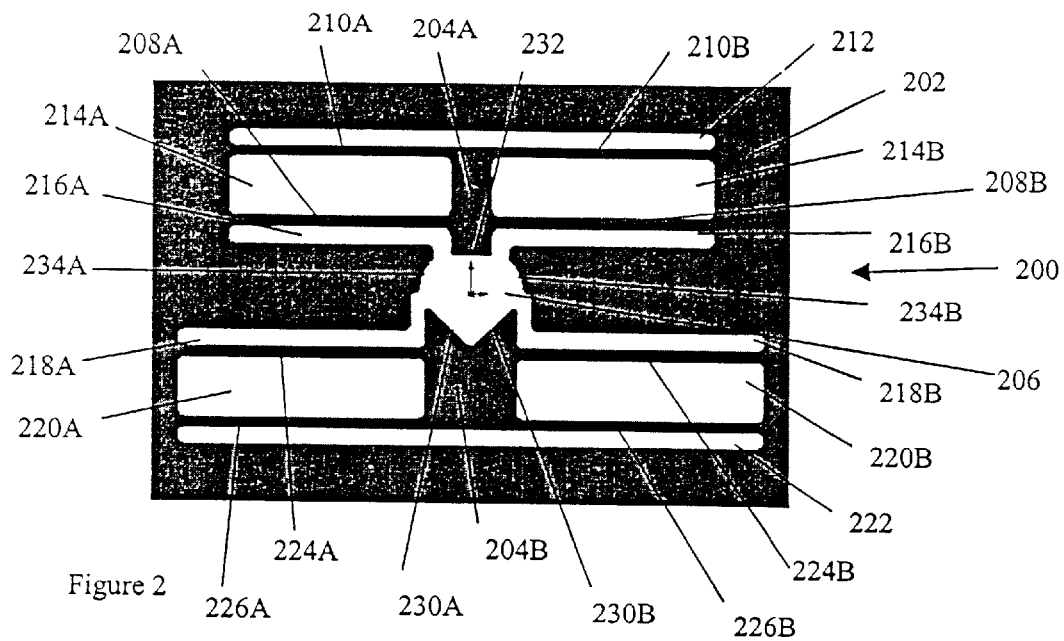
FIG. 2 illustrates a top view of another embodiment of a support structure.

Thus, the structures 100, 200 in FIGS. 1A, 2 and 12 provide good lateral centration of a fiber or lens. Lateral centration may be defined as how close a center axis of a fiber or lens, where it crosses an upper surface of the substrate 102 (FIG. 1A), comes to a pre-determined point, e.g., the center of the hole 106, on that surface. The structure 100 in FIG. 1A also provides temporary restraint and alignment such that the center axis of the fiber or lens is extremely close to a normal vector of the substrate surface. The structure 100 accommodates (i.e., compensates for) diameter imperfections of a fiber or lens, e.g., up to a couple microns for fibers and tens of microns for lenses. This characteristic may be called a 'tolerance' for diameter imperfections.

In one configuration, there are two intended compliant degrees of freedom (also called 'soft' degrees of freedom) for each flexure 112 and flexure jaw 104. The two intended compliant degrees of freedom include (1) a radial direction (i.e., translation normal to the plane of the flexure 112) and (2) a rotation about a line formed by the intersection of the plane of FIG. 1A and the flexure plane (also called 'twist flexibility' of a flexure jaw 104). For example, the flexure 112B and flexure jaw 104B have the two intended compliant degrees of freedom: the normal 140B and a rotation 144, as shown in FIG. 1A.

The DRIE fabrication methods described above may form jaw faces 108A–108C that are symmetric but non-parallel due to a fabrication error or 'draft,' as shown in FIG. 1B. In FIG. 1B, lithography forms a mask on a surface 132 ('mask' surface, as described above) and a micro-machining process forms the hole 106 through to the other surface 138 of the substrate 102. As the depth of jaw faces 108A, 108B is formed (into the page in FIG. 1A; see also FIGS. 4 and 5), the jaw faces 108A, 108B will angle slightly radially outward from the mask surface 132 of the substrate 102 to a non-mask surface 138 of the substrate 102. In one configuration, the structure 100 in FIG. 1A has approximately one degree of fabrication error or draft. FIG. 1B shows more than one degree for the purpose of illustration.

As a result of the fabrication error, the diameter of the hole 106 in FIG. 1B at the non-mask surface 138 may be slightly larger than the diameter of the hole 106 at the mask surface 132 ('mask' surface) of the substrate 102.

FIGS. 1B–1F illustrate a side view of a part of the structure 100 in FIG. 1A with twist flexibility and radial flexibility. In FIGS. 1B, 1D and 1E, the vector 118 is in the plane of the flexures 112 in an unflexed state. In one method shown in FIGS. 1B–1C, an optical element 130, such as a lens or fiber, is inserted into one end 136 of the hole 106 in the substrate 102 starting at the non-mask surface 138 of the substrate 102. In FIGS. 1C, 1E and 1F, the action of inserting the element 130 downward into the jaws 104A, 104B creates radial forces 116 on the jaws 104A, 104B. The flexures 112 in FIGS. 1B–1F provide twist flexibility for the jaws 104A, 104B, such that the jaws 104A–104B twist radially outward toward the other end 134 of the hole 106 to accommodate the entering element 130.

The twisting may stop when a substantial length of the jaw faces 108A–108C come in contact with the element 130. FIG. 1C illustrates an example when an element 130, such as a fiber, is fully inserted in the hole 106. The edges where the mask surface 132 meets the jaw faces 108A–108C are the most extended parts of the structure 100.

The two intended soft degrees of freedom described above allow the structure 100 to better receive and grip a lens or fiber 130 in the hole 106 (FIG. 1C). Without twist flexibility (not shown), a part of a jaw face 108 may contact only a part of the element 130 instead of a length of the element 130 that is equal to the thickness of the substrate 102. This partial contact results in only partial control of the position of the element 130, which may be unacceptable in some applications.

FIGS. 1D–1F are isometric pictures of a flexure 112 in FIGS. 1A–1C. FIGS. 1D–1F show how an applied force 116 at an arbitrary point on one end of the flexure 112 can be re-calculated as that force 116 plus a moment 120 applied at the neutral axis 118 of the flexure 112. The moment 120 is equal to one-half of the depth "w" in FIG. 1G of the flexure 112 multiplied by the force 116. Thus, the motion of the flexure jaws 104A, 104B in FIG. 1C is a superposition of the separate motions due to the force 116 and the moment 120 in FIG. 1E. Specifically, the force 116 produces local radial motion of the flexure end 122, and the moment 120 produces twist motion, as shown by the position 124 of the flexure 112 in FIG. 1F.

FIGS. 1G–1H illustrate an example of twist stiffness for a flexure 112 in FIG. 1A. As shown in FIG. 1G, the flexure 112 has a width "w," a length "L" and a thickness "t." In FIG. 1H, the flexure 112 has a twist stiffness equal to JG/L, where J is equal to $0.333t^3w$ and G is the shear modulus. As one of ordinary skill in the art would understand, the shear modulus G is equal to T/Y, where T is shear stress and Y is shear strain. The shear stress T is equal to Fs/As, where Fs is the shear force and As is the sheared area.

In one configuration, it is desirable to have the undeformed jaw faces 108A–108C in FIG. 1A at a distance from the center of the optical element 130. It may also be desirable to have the undeformed jaw faces 108A–108C significantly undersized compared to the radius of the fiber or lens and its tolerances (i.e., tolerated diameter imperfections of the fiber or lens). In this configuration, the shape of the jaw faces 108A–108C do not form a perfect circle in its relaxed or unflexed state (without a fiber or lens inserted), as shown in FIG. 1A.

When an optical element 130 is inserted in the hole 106, the jaws 104A–104C may deflect radially outward (e.g., by about 10–15 microns) as shown by the arrows 140A–140C in FIG. 1A to form a circle with a diameter of about 125 microns. A fiber core with cladding has a diameter of about 125 microns. The elastic nature of the flexures 112A–112C applies an opposite (radially inward) force to the jaws 104A–104C on the optical element 130 toward the center of the hole 106. This radially inward force is called a 'preload' on the optical element 130 in the hole 106. When the optical element 130 is engaged in the hole 106 of the structure 100, the relatively constant, uniform preload holds the optical element 130 in a desired position.

After the structure 100 restrains the optical element 130, the optical element 130 may be glued or bonded to the structure 100. In one method, an adhesive substantially fills all of the flexure grooves 110A–110C, 148A–148D and channels shown in FIG. 1A. In one configuration, after the adhesive or bonding process is complete, the flexures 112A–112C are no longer flexible. In FIG. 1A, the structure 100 may also have a protrusion 114. The protrusion 114 may facilitate the even flow of a bonding agent inserted in and between the spaces 110A–110C, 148A–148D. In another method, the optical element 130 is not glued or bonded to the structure 100.

Figure 3:
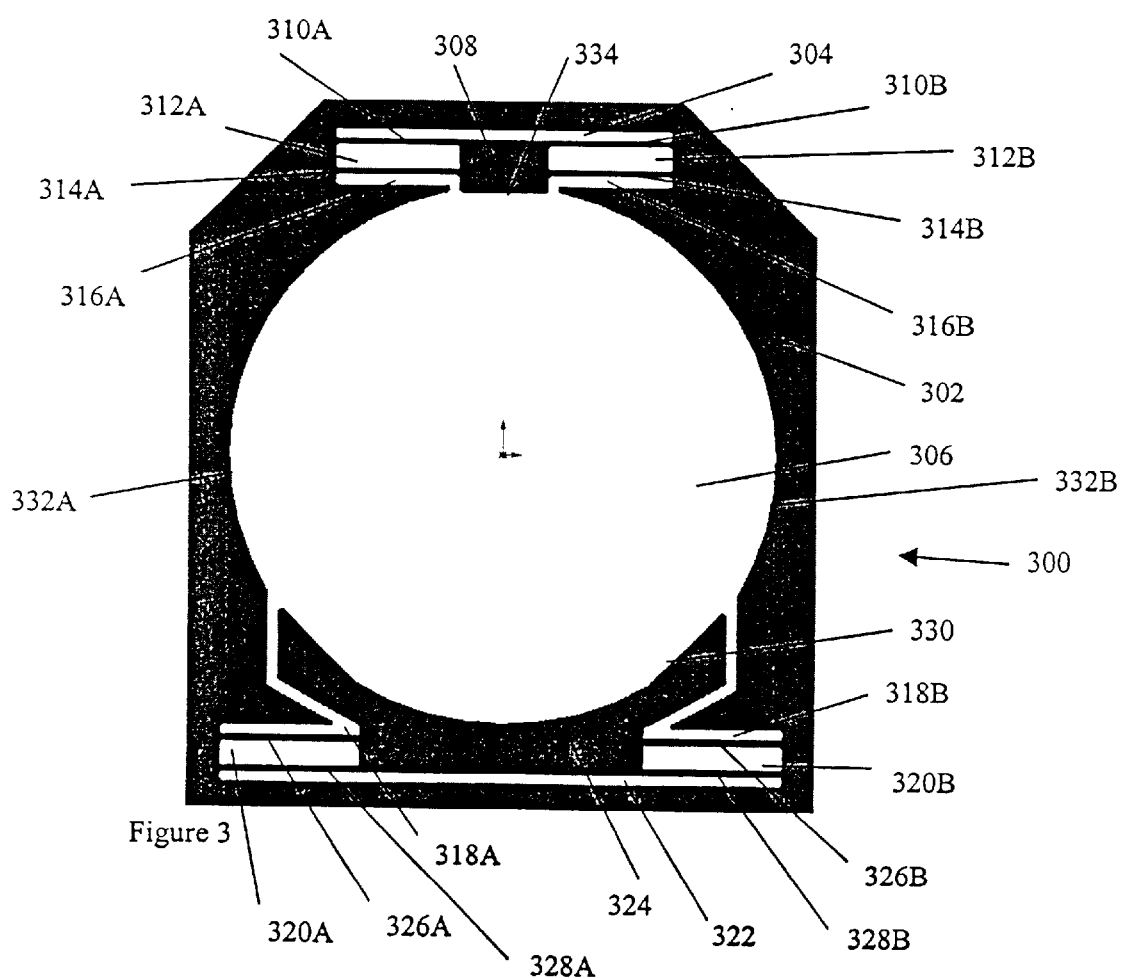
FIG. 3 illustrates a top view of another embodiment of a support structure.

FIGS. 1I–1J are described below with reference to FIGS. 2 and 3. The structures 200, 300 in FIGS. 2 and 3 may provide similar twist flexibility as the twist flexibility of the structure 100 shown in FIGS. 1A–1H. In one embodiment, the structures 200, 300 in FIGS. 2 and 3 provide a stiffer twist flexibility than the structure 100 shown in FIG. 1A, as described below.

For some applications, it is desirable to have the twist flexibility of the jaws 104A–104C in FIG. 1A with symmetric but non-parallel jaw faces 108A–108C and two collinear flexure plates 112 to support each jaw 104. This structure 100 relies on the twist flexibility of a thin plate 112, as shown in FIGS. 1D–1H.

Analysis of the structure 100 in FIGS. 1A–1H and variations thereof led to at least two general design revelations. First, single-crystal silicon substrate is orthotropic, i.e., there are different stiffness properties in different directions. The orthotropic nature of single-crystal silicon may require the planes of the flexures 112A–112C (with equal thicknesses) to be formed at particular angles on a substrate 102 to achieve equal stiffness contributions (and hence a high degree of centration under deformation). For example, for the <100> horizontal direction in FIG. 1A of an orthotropic substrate 102, the angles of the flexure planes to achieve equal stiffness are approximately 0, +116 and –116 degrees: one flexure 112B at 0 degrees and two flexures 112A, 112C at about +/–116 degrees to the horizontal flexure 112B. Due to the orthotropic nature of silicon, this type of configuration should be aligned to either the <100> horizontal direction or the <010> vertical direction to achieve good centration.

Because of the orthotropic nature of single-crystal silicon, if a structure is formed on a substrate 102 rotated by 90, 180 or 270 degrees compared to the structure 100 in FIG. 1A, the stiffness and centration properties should be the same as the properties described above. If the structure 100 in FIG. 1A is rotated and formed on a silicon substrate, such that a flexure plane does not match these <100> or <010> directions, then a different set of flexure angles should be calculated and used to achieve good centration and stiffness contributions.

A symmetric flexure arrangement (one flexure at 0 degrees and the other two flexures at +/–120 degrees) could be formed with good centration and stiffness contributions by tailoring (i.e., modifying) the thicknesses or lengths of one or more pairs of flexure plates 112A–112C to create a stiffness match. Thickness tailoring, however, may be difficult to accurately achieve and may be undesirable because any undercutting during the fabrication process would change the ratio of thicknesses of the flexure plates 112A–112C and hence stiffnesses of the flexures 112A–112C.

The second revelation from analyzing support structures similar to FIG. 1A with particular aspect ratios and overall dimensions was that the twist flexibility of a collinear pair of flexure plates 112A–112C may be too high to achieve (1) good centration and (2) alignment of an optical element with the surface normal of the structure 100, depending on the type of optical element, the size of the element and the particular application of the support structure. It may be desirable for a lens or fiber support structure to have a stiffer twist flexibility Arriving at a metric (standard) for twist flexibility may be an ad hoc process, depending on the desired application of the support structure. As mentioned above, the structure 100 in FIG. 1A may have approximately one degree of fabrication error/draft (see FIGS. 1B–1C). The one degree of fabrication error/draft should be removed when a fiber 130 is inserted in the hole 106 all the way, as shown in FIG. 1C, where the jaws 104A–104C are under full preload. Thus, with the preload applied at the upper and/or lower edge of a jaw 104, about one degree of rotation/twist flexibility should be observed. One model of structure 100 exhibited almost ten degrees of rotation/twist flexibility.

With ten degrees of twist flexibility, if an optical element is not perfectly perpendicular to a normal of the substrate surface 138 (FIG. 1B) as the optical element is inserted in the hole 106, there may be insufficient force to restore the optical element to proper alignment when the optical element is fully inserted. However, a lateral restraint/centration structure with high angular flexibility may be useful for some applications.

FIG. 2 illustrates a top view of another embodiment of a support structure 200 for optical fibers or other components. FIG. 3 illustrates a top view of another embodiment of a support structure 300 for rod lenses, e.g., 1.8 mm in diameter, or other components.

Figure 4:
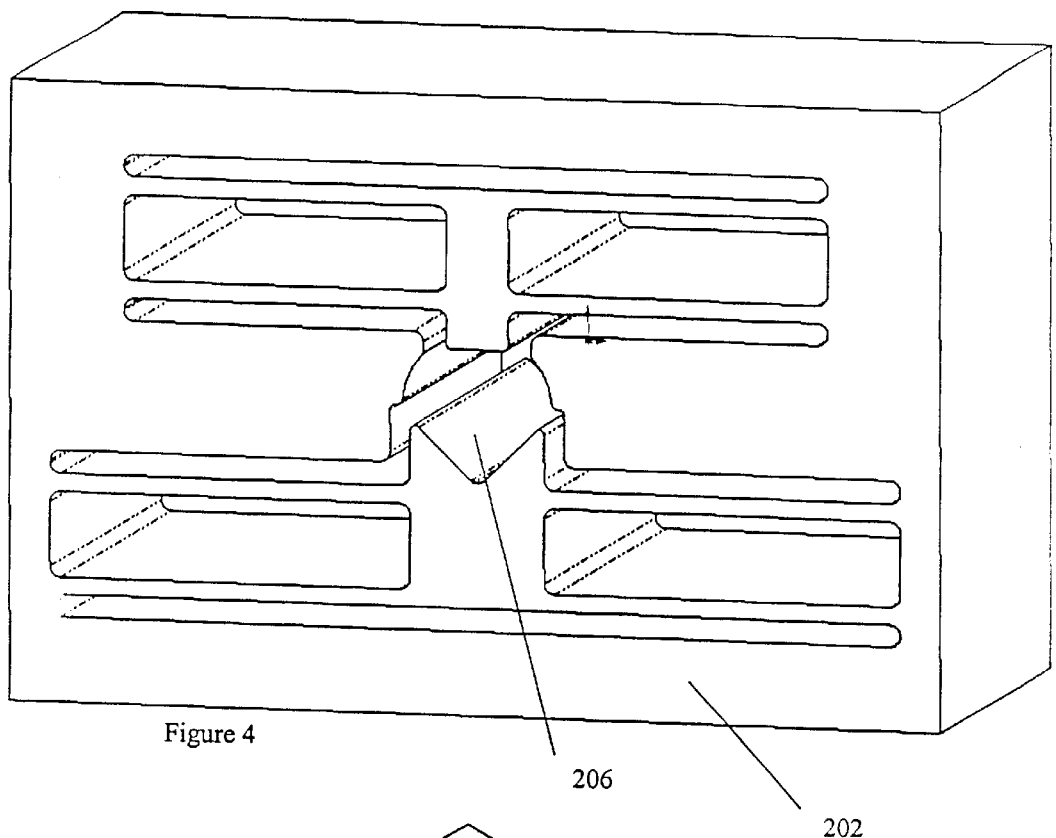
FIG. 4 illustrates a three-dimensional view of the structure in FIG. 2.
Figure 5:
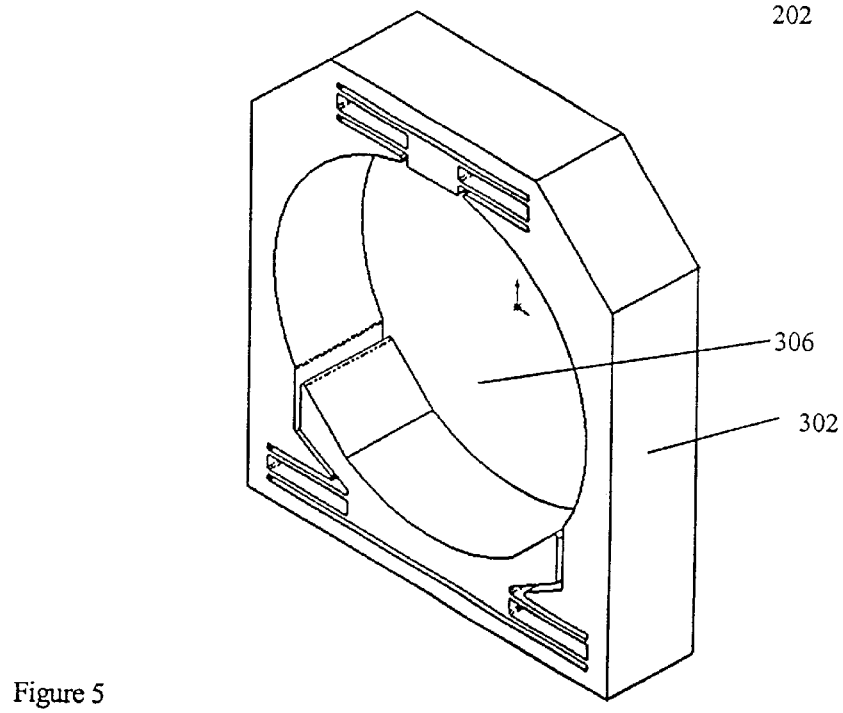
FIG. 5 illustrates a three-dimensional view of the structure in FIG. 3.

FIG. 4 illustrates a three-dimensional view of the structure 200 in FIG. 2. FIG. 5 illustrates a three-dimensional view of the structure 300 in FIG. 3. The structure 200 in FIGS. 2 and 4 and the structure 300 in FIGS. 3 and 5 address the two design revelations described above.

In one embodiment, it is desirable for the functions of a support structure (temporary restraint of an element with good centration and alignment) to be independent of orientation on the wafer. This embodiment provides more flexible application and reduces engineering computations used to form the structure. One solution is to use only two flexured jaws where the flexures of both sides are all parallel.

For example, the flexure jaws 204A, 204B in FIG. 2 have flexures 210A, 210B, 208A, 208B, 224A, 224B, 226A, 226B that are preferably all parallel. As used herein, the term 'flexure' refers to both plates, e.g., 210A, 210B or one plate, e.g., 210A. As another example, the flexure jaws 308, 324 in FIG. 3 have flexures 310A, 310B, 314A, 314B, 326A, 326B, 328A, 328B that are preferably all parallel. Because the flexures 210A, 210B, 208A, 208B, 224A, 224B, 226A, 226B in FIG. 2 (and the flexures 310A, 310B, 314A, 314B, 326A, 326B, 328A, 328B in FIG. 3) are parallel, they operate with the same material properties (e.g., shear modulus, stiffness, Young's modulus,) associated with the material of the structures 200, 300 (e.g., silicon), regardless of orientation on a substrate/wafer. The absolute stiffnesses may vary with an angle of orientation on a substrate/wafer, but should stay matched between the parallel flexure pairs.

In one embodiment, the structure 200 in FIG. 2 has flexures 210A, 210B, 208A, 208B, 224A, 224B, 226A, 226B with the same thickness. Likewise, one embodiment of the structure 300 in FIG. 3 has flexures 310A, 310B, 314A, 314B, 326A, 326B, 328A, 328B with the same thickness.

In one embodiment, a length of one of the bottom flexures 224, 226 is substantially equal to $(1/\cos \theta)^{1/3}$ multiplied by a length of one of the top flexures 208, 210. In one embodiment, the distance between a bottom pair of flexures 224, 226 is slightly different than the distance between a top pair of flexures 208, 210 to have equal twist flexibility. In one configuration, the distance between the bottom pair of flexures 224, 226 should be approximately $(1/\cos \theta)^{1/6}$ multiplied by the distance between the top pair of flexures 208, 210. This factor is almost equal to one, e.g., 1.024 for θ=30 degrees and 1.059 for θ=45 degrees.

FIGS. 6 and 7 illustrate three-dimensional views of active parts of the structure 200 in FIG. 2. In FIGS. 6 and 7, vertical loads are applied at a front face of the jaws 204A, 204B to illustrate twist flexibility. The top jaw 204A may displace vertically up, and the bottom jaw 204B displaces vertically down. The jaws 204A, 204B also twist with respect to a horizontal axis "x."

For the structure 200 in FIG. 2 to restrain an optical element in desired degrees of freedom (e.g., laterally or vertically and horizontally in the plane of FIG. 2), at least one jaw 204B should have two tangent faces 230A, 230B to restrain the fiber or lens. The two faces 230A, 230B essentially form a V-shaped groove restraint.

The two tangent faces 230A, 230B may, however, constrain the stiffness requirements of the flexures 224A, 224B, 226A, 226B. In one configuration, the motion of the V-shaped groove jaw 204B should be greater than the motion of the jaw 204A under preload because the deformation direction, i.e., vertically down in FIG. 2, is no longer perpendicular to the tangent jaw faces 230A, 230B. The greater motion of the jaw 204B may maintain centration characteristics. In other words, for the center axis of an inserted cylindrical object of varying diameter (see FIG. 12) to remain fixed in lateral position, the V-groove jaw 204B should deflect further, and hence have lower stiffness, than the flat jaw 204A.

The increased motion/radial flexibility is substantially equal to $1/\cos\theta$, where $\theta$ is the angle between the V-shaped groove tangent faces 230A, 230B and the horizontal plane of the flexures 224A, 224B, 226A, 226B in an unflexed state. An equivalent statement is the vertical stiffness of the V-shaped groove jaw 204B should be $\cos\theta$ times the vertical stiffness of the jaw 204A with a flat jaw face 232. The angle $\theta$ may range from about 30 degrees to about 45 degrees. Consequently, the stiffness of the V-shaped groove flexures 224A, 224B, 226A, 226B should be reduced by $\cos\theta$, which may be accomplished by lengthening the V-shaped groove flexures 224A, 224B, 226A, 226B by $(1/\cos\theta)^{0.33}$.

Similarly, the jaw 324 in FIG. 3 has jaw faces 330 and 331 that may restrain an optical element in the same desired degrees of freedom as the V-shaped groove jaw 204B in FIG. 2 In essence, the jaw faces 330 and 331 form a U-groove with the apex or pit of the V-groove 230A, 230B in FIG. 2 filled in.

The jaw faces 330 and 331 in FIG. 3 also constrain the stiffness requirements of the flexures 326A, 326B, 328A, and 328B. The motion of the jaw 324 should be greater than the motion of the jaw 308 under preload to maintain centration characteristics. The increased motion may be approximately equal to $1/\cos\theta$, where $\theta$ is the angle between jaw faces 330 and 331 and the horizontal plane of the flexures 326A, 326B 328A, 328B. The angle $\theta$ may range from about 30 degrees to about 45 degrees. Consequently, the stiffness of the flexures 326A, 326B, 328A, 328B should be reduced by $\cos\theta$, which may be accomplished by lengthening the flexures 326A, 326B, 328A, 328B by $(1/\cos\theta)^{0.33}$.

To decrease the twist flexibility of a jaw, a second set of flexures may be added to the jaws 204A, 204B, 308, 324 in FIGS. 2 and 3, which are parallel to the first set and connected to the same jaw. In FIG. 2, the bottom jaw 204B is connected to a first set of flexures 224A, 224B and a second set of flexures 226A, 226B that is parallel to the first set. Also, the top jaw 204A is connected to a first set of flexures 208A, 208B and a second set of flexures 210A, 210B that is parallel to the first set. In FIG. 3, the bottom jaw 324 is connected to a first set of flexures 326A, 326B and a second set of flexures 328A, 328B that are parallel to the first set. Also, the top jaw 308 is connected a first set of flexures 314A, 314B and a second set of flexures 310A, 310B that are parallel to a first set.

In FIGS. 2 and 3, the twist flexibility of a jaw 204A, 204B, 308, 324 may be dominated by the out-of-plane shear stiffness of a flexure plate and a separation d (FIG. 1I) between the pairs of flexures. FIGS. 1I–1J illustrate an example of twist stiffness for a flexure pair in FIG. 2 or FIG. 3. In FIG. 1I, the center planes of two flexures 150A, 150B are separated by a distance d. The flexures 150A and 150B in FIG. 1I may represent any flexure pair in FIG. 2 or 3, such as the flexures 208A and 210A in FIG. 2. In FIG. 1J, the twist stiffness of the flexure pair is equal to $(2GA/L \times (d/2)^2) + 2JG/L$, where area A=thickness t×width w. Thus, if a smaller separation distance d is used, the flexures 150A, 150B would provide less twist stiffness, and hence more twist flexibility.

In macroscopic structures, this double-flexure arrangement may be called a "parallel motion flexure" and has essentially one degree of freedom—perpendicular to the flexure planes (the vertical direction in FIGS. 2 and 3). In MEMS scale structures, however, there is a finite twist flexibility that remains for small separations d of flexure pairs, such as the flexure pair 224A and 226A and the flexure pair 224B, 226B in FIG. 2. By estimating the twist flexibility of two sets of flexures to be about one tenth of the twist flexibility of one set of flexures (i.e., twist stiffness for two sets of flexures is 10 times greater than one set of flexures), the separation (centerline-to-centerline) between the sets of flexures may be about 100 microns. Separation distances between flexures less than or greater than 100 microns may be implemented for other desired degrees of twist flexibility or stiffness and provide an angular positioning constraint.

In one embodiment, machined spaces or voids in the structure are minimized in at least one dimension to keep high capillary action for wicking a bonding agent throughout the thickness of the wafer.

Figure 8:
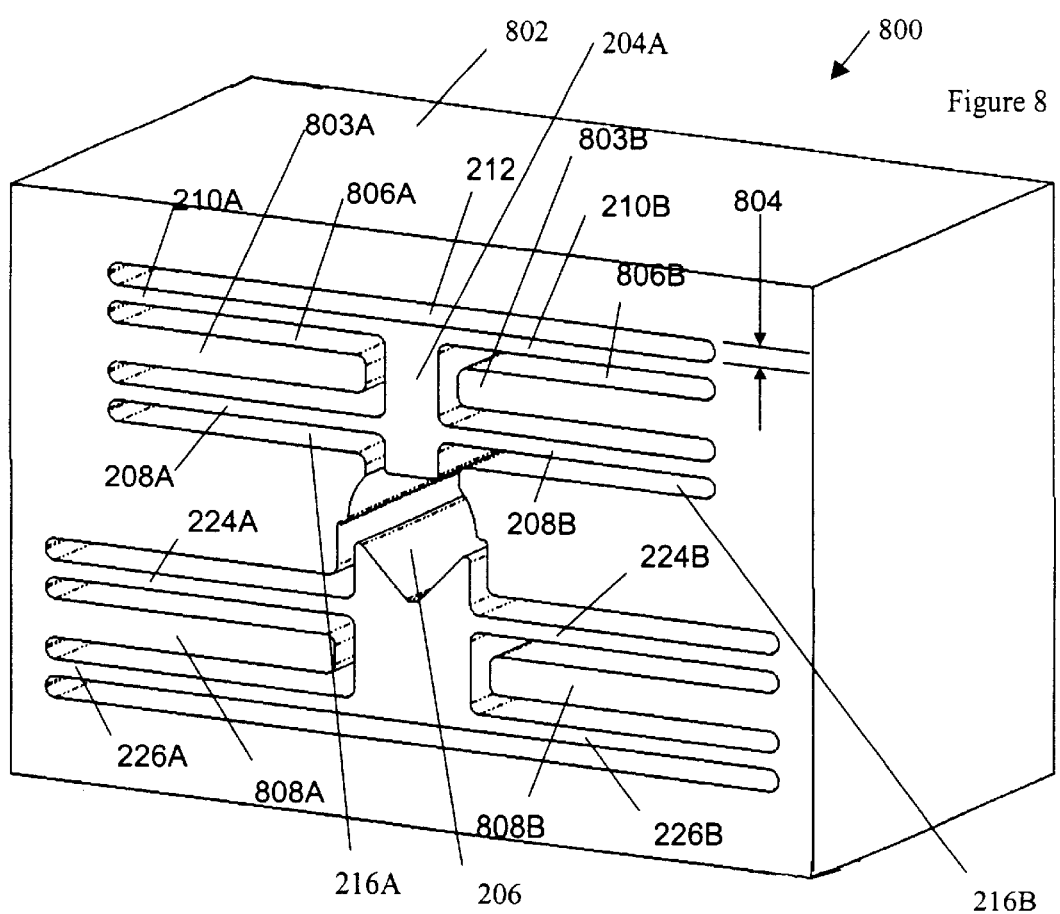
FIG. 8 illustrates another embodiment of a support structure.
Figure 9:
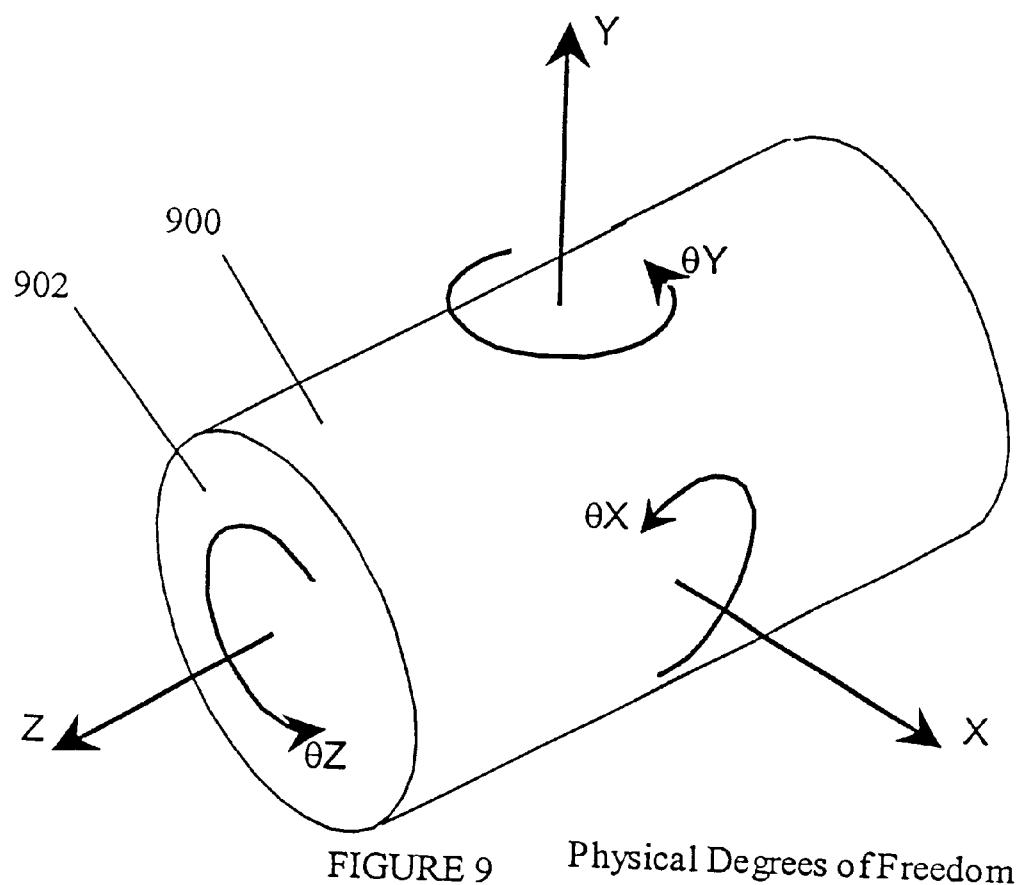
FIG. 9 illustrates an optical fiber with at least six positional degrees of freedom (DOFs).
Figure 10:
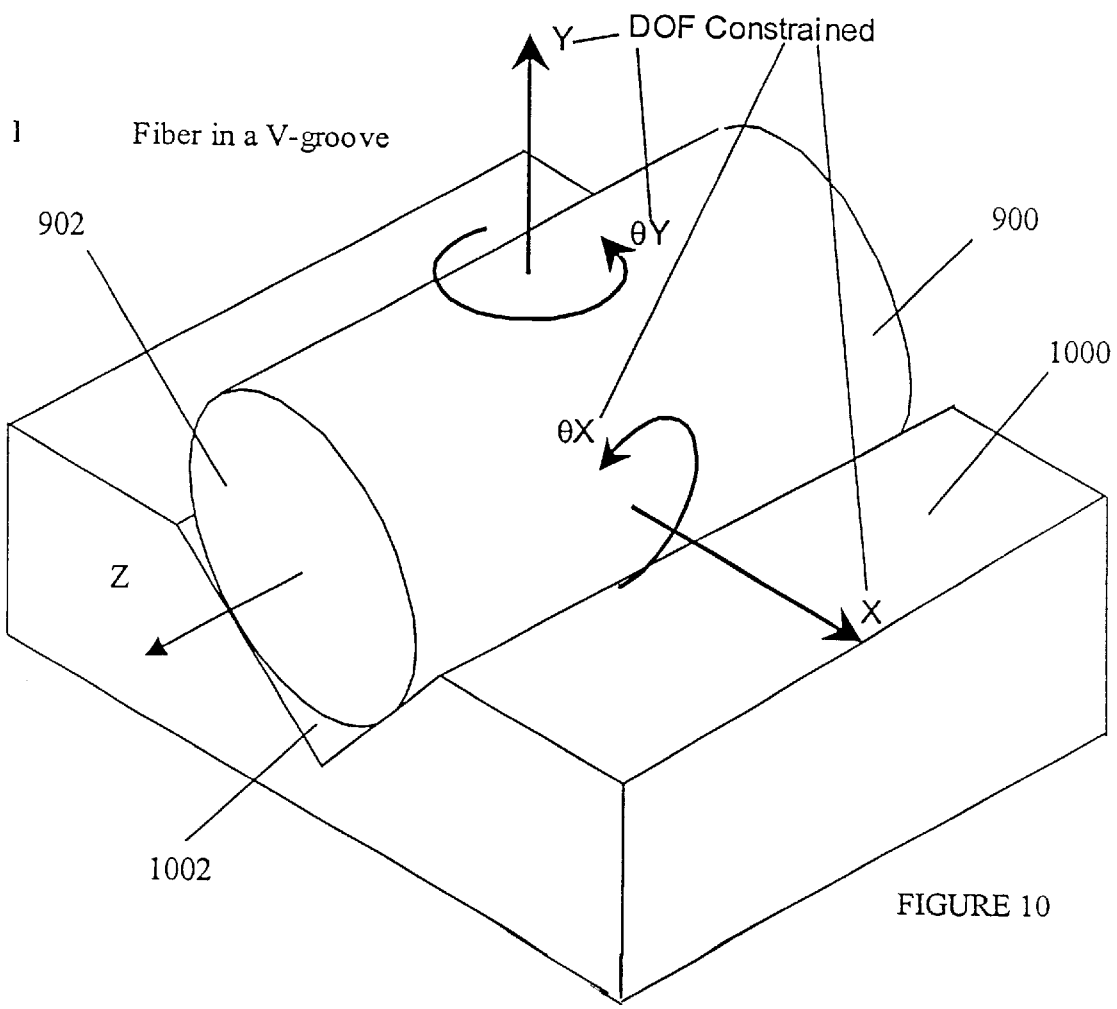
FIG. 10 illustrates four DOFs of a fiber controlled by a V-groove in a silicon structure.

FIG. 8 illustrates another embodiment of a support structure 800 where machined spaces or voids in the structure 800 are reduced. The structure 800 may be referred to as a 'filled' version of the support structure 200 of FIG. 2. In FIG. 8, the appendages 803A, 803B, 808A, 808B have been added to the support structure 200 of FIG. 2. The flexure blades 210A, 210B, 208A, 208B, 224A, 224B, 226A, 226B in FIG. 8 are identical to the flexure blades in FIG. 2, and their motion is not hampered in any way.

The purpose of the appendages 803A, 803B, 808A, 808B in FIG. 8 is to give all channels, such as spaces 212, 216A, 216B, 806A, 806B, cut through the wafer a common dimension or width 804. In one embodiment, the dimension 804 is about 30 microns. The structure 800 may have at least two advantages over the structure 200. First, if an adhesive, such as a low-viscosity fluid, is applied to the structure 800 after an optical element is inserted in the hole 206, the adhesive may wick through the spaces, such as spaces 212, 216A, 216B, 806A, 806B, in a consistent manner such that capillary forces are balanced across the flexure blades 210A, 210B, 208A, 208B, 224A, 224B, 226A, 226B.

Second, the process of DRIE etching is now the same everywhere on the structure 800 because etching is primarily controlled by dimension 804, and hence the recipe is easier to specify.

Friction may be one parameter that affects the structures 100, 200, 300 in FIGS. 1, 2 and 3. If insertion of an optical element into the hole 106, 206 or 306 is not angularly guided, the rest attitude of the optical element will be partially determined by the friction between the optical element and the jaw faces 108A–108C, 230A, 230B, 232, 234A, 234B, 334, 332A, 332B, 330. In particular, there may be a minimum "angle of repose" dependent on the coefficient of friction between the substrate material and the optical element, the preload, and the diameter of the optical element.

One embodiment of the structure 100 in FIG. 1 and one embodiment of the structure 200 in FIG. 2 for constraining fibers will have very low angles of repose (approximately $6.3 \times 10^{-4} \times$coefficient of friction)(measured in radians) due to the relatively small diameters (e.g., 125 microns) of fibers.

The diameter of a lens may be greater than the diameter of a fiber and greater than a wafer/substrate thickness. In one embodiment, the structure 300 in FIG. 3 has a hole 306 with a 1.8 mm diameter to accommodate a lens and has a much higher angle of repose (about $0.0448 \times$coefficient of friction). A structure design with double the flexure spacing d and thinner flexures may reduce the angle of repose to about $0.00585 \times$coefficient of friction. Alternatively, guiding the lens during insertion or a post-insertion alignment may reduce or eliminate the angle of repose caused by friction.

The above-described embodiments of the present invention are merely meant to be illustrative and not limiting. Various changes and modifications may be made without departing from the invention in its broader aspects. For example, the structures 200, 300, 800 in FIGS. 2, 3 and 8 may have more than or less than the number of flexures shown in FIGS. 2, 3 and 8.

As another example, for two jaw versions, a ratio of stiffness that is not equal to $1/\cos\theta$ may be used between the two flexured jaws. As a result, the restrained position of the axis of a supported element changes with the diameter of the element. This may be useful for fine pointing control of a lens—fiber collimator.

The restrained position of an element may be adjusted by using a micromachining process, e.g., FIB or laser machining, to lengthen or thin the flexures. This technique may be used on either two jaw or three jaw embodiments. The restrained element may or may not be glued in place after such an operation.

The restrained position of an element may be adjusted by making one or more flexures on each jaw powered actuators or attaching actuators to the flexures. These actuators may take the form of piezoelectric or thermal (i.e., differential coefficient of thermal expansion) coatings applied to the flexures, or more traditional electrostatic comb drives attached to the jaws.

For all variations, the flexure elements may be more than the simple plates illustrated in FIGS. 1A–8. For example, the flexure elements may take the form of a thicker plate with necked-down sections at either end. This type of flexure is stronger axially than a simple plate flexure and may be used where buckling is a concern.

The appended claims encompass such changes and modifications within the spirit and scope of the invention.

What is claimed is:

1. A support structure configured to restrain an optical element in at least two degrees of freedom, the structure comprising:
   a first jaw with a first jaw face configured to contact the optical element;
   a first flexure attached to the first jaw;
   a second jaw with a second jaw face configured to contact the optical element; and
   a second flexure attached to the second jaw, wherein the first jaw face and the second jaw face are configured to restrain the optical element in at least two degrees of freedom, wherein the first flexure comprises a first collinear pair of plates, and the second flexure comprises a second collinear pair of plates.

2. The support structure of claim 1, wherein the flexures allow the first and second jaws to move in substantially opposite directions perpendicular to a plane of at least one flexure as the optical element is inserted through a recess formed by the first and second jaw faces.

3. The support structure of claim 2, wherein the recess formed by the jaw faces in an unflexed state is smaller than a minimum diameter of the optical element, which results in a preload force on the optical element after the optical element is inserted in the recess.

4. The support structure of claim 3, wherein the preload is sufficient to substantially align the optical element to a surface normal of the structure.

5. The support structure of claim 1, wherein the optical element is an optical fiber.

6. The support structure of claim 1, wherein the optical element is a lens.

7. The support structure of claim 1, wherein the structure is formed from a silicon substrate.

8. The support structure of claim 1, wherein the two restrained degrees of freedom define a plane of at least one flexure.

9. The support structure of claim 1, wherein the first flexure is substantially parallel to the second flexure in an unflexed state.

10. The support structure of claim 1, wherein the first jaw face has a substantially flat surface that is tangent to the optical element and perpendicular to a flexured direction of motion.

11. The support structure of claim 1, wherein the second jaw face has at least a first surface and a second surface configured to contact the optical element, wherein the surfaces are not parallel.

12. The support structure of claim 11, wherein the first surface is at an angle from about 30 to about 45 degrees to a plane of the second flexure in an unflexed state, and the second surface is at an angle between about $-30$ and about $-45$ degrees to the plane of the second flexure in the unflexed state.

13. The support structure of claim 11, wherein the first surface and the second surface form a substantially v-shaped groove.

14. The support structure of claim 1, wherein the first and second flexures are substantially equal in thickness.

15. The support structure of claim 1, wherein the first and second jaws constrain the optical element such that a central axis of the optical element is aligned with a predetermined point that is fixed with respect to the substrate.

16. The support structure of claim 15, wherein the predetermined point is a geometric center of a recess formed by the first and second jaw faces.

17. The support structure of claim 1, wherein a thickness of the first flexure is at least $\frac{1}{30}$th of a thickness of the structure.

18. The support structure of claim 1, wherein the structure is formed by lithography and a deep reactive ion etch process.

19. The support structure of claim 1, wherein the structure is formed by sacrificial molding.

20. The support structure of claim 1, wherein the structure is formed by X-Ray lithography.

21. The support structure of claim 1, wherein the structure is formed by lithography and laser etching.

22. The support structure of claim 1, wherein the structure is formed by lithography and focused ion beam etching.

23. The support structure of claim 1, wherein the structure is formed by lithography and Plunge electrical discharge machining (EDM).

24. The support structure of claim 1, wherein the structure is formed by lithography and wire electrical discharge machining.

25. The support structure of claim 1, wherein the structure is formed by lithography and laser cutting.

26. The support structure of claim 1, wherein the structure is formed by lithography and standard precision machining.

27. A support structure configured to restrain an optical element in at least two degrees of freedom, the structure comprising:
- a first jaw with a first jaw face configured to contact the optical element;
- a first flexure attached to the first jaw;
- a second jaw with a second jaw face configured to contact the optical element; and
- a second flexure attached to the second jaw, wherein the first jaw face and the second jaw face are configured to restrain the optical element in at least two degrees of freedom;
- wherein the two restrained degrees of freedom comprise a first vector parallel with at least one flexure and a rotation about a second vector substantially perpendicular to the plane of at least one flexure.

28. A support structure configured to restrain an optical element in at least two degrees of freedom, the structure comprising:
- a first jaw with a first jaw face configured to contact the optical element;
- a first flexure attached to the first jaw;
- a second jaw with a second jaw face configured to contact the optical element; and
- a second flexure attached to the second jaw, wherein the first jaw face and the second jaw face are configured to restrain the optical element in at least two degrees of freedom;
- wherein the first flexure allows a portion of the first jaw to twist away from the optical element as the optical element contacts the first jaw face.

29. The support structure of claim 28, wherein the second flexure allows a portion of the second jaw to twist away from the optical element as the optical element contacts the second jaw face.

30. A support structure configured to restrain an optical element in at least two degrees of freedom, the structure comprising:
- a first jaw with a first jaw face configured to contact the optical element;
- a first flexure attached to the first jaw;
- a second jaw with a second jaw face configured to contact the optical element; and a second flexure attached to the second jaw, wherein the first jaw face and the second jaw face are configured to restrain the optical element in at least two degrees of freedom;
- wherein the second jaw face has at least a first surface and a second surface configured to contact the optical element, wherein the surfaces are not parallel;
- wherein a radial flexibility of the second jaw face is substantially equal to $1/\cos\theta$ multiplied by a radial flexibility of the first jaw face, where $\theta$ is an angle between a plane of the second flexure in an unflexed state and the first surface.

31. A support structure configured to restrain an optical element in at least two degrees of freedom, the structure comprising:
- a first jaw with a first jaw face configured to contact the optical element;
- a first flexure attached to the first jaw;
- a second jaw with a second jaw face configured to contact the optical element; and
- a second flexure attached to the second jaw, wherein the first jaw face and the second jaw face are configured to restrain the optical element in at least two degrees of freedom;
- wherein a length of the second flexure is substantially equal to $(1/\cos\theta)^{1/3}$ multiplied by a length of the first flexure.

32. A support structure configured to restrain an optical element in at least two degrees of freedom, the structure comprising:
- a first jaw with a first jaw face configured to contact the optical element;
- a first flexure attached to the first jaw;
- a second jaw with a second jaw face configured to contact the optical element;
- a second flexure attached to the second jaw, wherein the first jaw face and the second jaw face are configured to restrain the optical element in at least two degrees of freedom;
- a third flexure attached to the first jaw; and
- a fourth flexure attached to the second jaw.

33. The support structure of claim 32, wherein the first flexure is substantially parallel to at least the third flexure, and the second flexure is substantially parallel to at least the fourth flexure.

34. The support structure of claim 33, wherein the first jaw is constrained by the first and third flexures to move in a direction substantially perpendicular to a plane of the first and third flexures as the optical element enters a recess formed by the first and second jaw faces.

35. The support structure of claim 33, wherein the second jaw is constrained by the second and fourth flexures to move in a direction substantially perpendicular to a plane of the second and fourth flexures as the optical element enters a recess formed by the first and second jaw faces.

36. The support structure of claim 33, wherein the first and third flexures move in parallel together as the optical element moves through a recess formed by the first and second jaw faces.

37. The structure of claim 33, wherein the second and fourth flexures move in parallel together as the optical element enters a recess formed by the first and second jaw faces.

38. The support structure of claim 32, wherein a length of the second and fourth flexures are substantially $(1/\cos\theta)^{1/3}$ multiplied by a length of the first and third flexures.

39. The support structure of claim 32, wherein the first, second, third and fourth flexures are substantially equal in thickness.

40. The support structure of claim 32, wherein the distance between the first and third flexures is not equal to the distance between the second and fourth flexures.

41. The support structure of claim 32, wherein the distance between the second and fourth flexures is approximately $(1/\cos\theta)^{1/6}$ multiplied by the distance between the first and third flexures.

42. The support structure of claim 32, wherein the flexures allow portions of the first and second jaws to twist away from the optical element as the optical element contacts the first and second jaw faces.

43. The support structure of claim 42, wherein a distance between the first and third flexures and between the second and fourth flexures is configured to provide a twisting stiffness sufficient to provide an angular positioning constraint of the optical element.

44. The support structure of claim 32, wherein spaces around the first and third flexures are substantially equal in width in an unflexed state.

45. A support structure configured to restrain an optical element in at least two degrees of freedom, the structure comprising:
   a first jaw with a first jaw face configured to contact the optical element;
   a first flexure attached to the first jaw;
   a second jaw with a second jaw face configured to contact the optical element;
   a second flexure attached to the second jaw;
   a third jaw with a third jaw face configured to contact the optical element; and
   a third flexure attached to the third jaw, wherein the first, second and third jaw faces are configured to restrain the optical element in at least two degrees of freedom.

46. A structure configured to restrain an optical fiber in at least two degrees of freedom, the structure comprising:
   a first jaw with a first jaw face configured to contact the fiber;
   a first pair of flexure plates attached to the first jaw;
   a second jaw with a second jaw face configured to contact the fiber; and
   a second pair of flexure plates attached to the second jaw, wherein the first jaw face and the second jaw face are configured to restrain the fiber in at least two degrees of freedom and allow the first and second jaws to move in substantially opposite directions perpendicular to a plane of at least one flexure as the fiber enters a recess formed by the first and second jaw faces.

47. A method of forming an optical element support structure, the method comprising:
   using radiation and a patterned mask to affect predetermined areas of a photo-sensitive film on a substrate, the mask outlining:
      a first jaw with a first jaw face configured to contact an optical element;
      a first flexure attached to the first jaw;
      a second jaw with a second jaw face configured to contact the optical element; and
      a second flexure attached to the second jaw, wherein the first jaw face and the second jaw face are configured to restrain the optical element in at least two degrees of freedom; and
   using a micromachining process to form the first jaw, first flexure, second jaw and second flexure in the substrate based on the mask outline.

48. The method of claim 47, wherein the mask further outlines:
   a third flexure attached to the first jaw, the third flexure being substantially parallel to the first flexure; and
   a fourth flexure attached to the second jaw, the fourth flexure being substantially parallel to the second flexure.

49. The method of claim 47, wherein the mask further outlines:
   a third jaw with a third jaw face configured to contact an optical element; and
   a third flexure attached to the third jaw, wherein the first, second and third jaw faces are configured to restrain the optical element in at least two degrees of freedom.

50. The method of claim 47, wherein the micromachining process comprises deep reactive ion etch.

51. The method of claim 47, wherein the micromachining process comprises sacrificial molding.

52. The method of claim 47, wherein the micromachining process comprises laser etching.

53. The method of claim 47, wherein the micromachining process comprises focused ion beam etching.

54. The method of claim 47, wherein the micromachining process comprises Plunge electrical discharge machining (EDM).

55. The method of claim 47, wherein the micromachining process comprises wire electrical discharge machining.

56. The method of claim 47, wherein the micromachining process comprises laser cutting.

57. The method of claim 47, wherein the micromachining process comprises standard precision machining.

58. A structure configured to restrain an optical element in at least two degrees of freedom, the structure comprising:
   a frame;
   a first jaw with a first jaw face configured to contact the optical element;
   a first flexure attached to the first jaw and the frame;
   a second jaw with a second jaw face configured to contact the optical element; and
   a second flexure attached to the second jaw and the frame, wherein the first jaw face and the second jaw face are configured to restrain the optical element in at least two degrees of freedom, wherein the frame, first jaw, first flexure, second jaw and second flexure are formed from a single piece of material with spaces formed in the piece of material to define the frame, first jaw, first flexure, second jaw and second flexure.

* * * * *